United States Patent
Sasaki et al.

(10) Patent No.: US 8,675,778 B2
(45) Date of Patent: Mar. 18, 2014

(54) CARRIER RECOVERY CIRCUIT AND DEMODULATION CIRCUIT UNDER QUASI-COHERENT DETECTION METHOD

(75) Inventors: Eisaku Sasaki, Tokyo (JP); Hirotaka Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/505,346

(22) PCT Filed: Nov. 5, 2010

(86) PCT No.: PCT/JP2010/069692
§ 371 (c)(1),
(2), (4) Date: May 1, 2012

(87) PCT Pub. No.: WO2011/055783
PCT Pub. Date: May 12, 2011

(65) Prior Publication Data
US 2012/0224657 A1   Sep. 6, 2012

(30) Foreign Application Priority Data
Nov. 5, 2009   (JP) .................................. 2009-254164

(51) Int. Cl.
*H04L 27/00* (2006.01)
*H03K 9/00* (2006.01)

(52) U.S. Cl.
USPC .......................................... 375/326; 375/316

(58) Field of Classification Search
USPC .................................. 375/326, 324, 322, 316
See application file for complete search history.

(56) References Cited

U.S. PATENT DOCUMENTS

| | | | | |
|---|---|---|---|---|
| 6,310,513 B1 * | 10/2001 | Iemura | ......................... | 329/304 |
| 7,529,321 B1 | 5/2009 | Shiraishi et al. | | |
| 7,680,225 B2 | 3/2010 | Tsumura | | |
| 2005/0289606 A1 | 12/2005 | Tsumura | | |
| 2009/0080578 A1 | 3/2009 | Naniwada | | |
| 2010/0067619 A1 * | 3/2010 | Furman et al. | ................ | 375/326 |

FOREIGN PATENT DOCUMENTS

| | | |
|---|---|---|
| JP | 03-034746 | 2/1991 |
| JP | 5-236040 | 9/1993 |
| JP | 11-136301 | 5/1999 |

(Continued)

OTHER PUBLICATIONS

International Search Report, PCT/JP2010/069692, Feb. 1, 2011.

(Continued)

*Primary Examiner* — Chieh M Fan
*Assistant Examiner* — Brian J Stevens
(74) *Attorney, Agent, or Firm* — Young & Thompson

(57) ABSTRACT

A carrier recovery circuit, adapted to a demodulation circuit according to a quasi-coherent detection method for generating baseband signals by way of quadrature detection on a received signal having an intermediate frequency, rotates phases of baseband signals; detects a phase error and an amplitude error; controls a bandwidth of a loop filter based on its difference; eliminates a high-frequency component from the phase error; and performs phase rotation based on the phase error eliminating its high-frequency component. It expands the bandwidth of the loop filter when a difference between the phase error and the amplitude error is greater than a predetermined threshold, whilst reducing bandwidth of the loop filter upon determining that the amplitude error decreases due to a reduction of the bandwidth of the loop filter. This optimizes the bandwidth of the loop filter to follow variations of the C/N ratio of the received signal, improving bit error rate.

7 Claims, 12 Drawing Sheets

(56) References Cited

FOREIGN PATENT DOCUMENTS

| | | |
|---|---|---|
| JP | 2000-101666 | 4/2000 |
| JP | 2002-094585 | 3/2002 |
| JP | 2003-531523 | 10/2003 |
| JP | 2004-179825 | 6/2004 |
| JP | 2005-191743 | 7/2005 |
| JP | 2006-121245 | 5/2006 |
| JP | 2006-129536 | 5/2006 |
| JP | 2009-081611 | 4/2009 |
| RU | 32346 U1 | 9/2003 |
| SU | 1755388 A1 | 8/1992 |
| WO | WO01/80511 | 10/2001 |

OTHER PUBLICATIONS

Russian Office Action dated Nov. 7, 2013; Application No. 2012117835; Decision on Grant.

* cited by examiner

CARRIER RECOVERY CIRCUIT AND DEMODULATION CIRCUIT UNDER QUASI-COHERENT DETECTION METHOD

TECHNICAL FIELD

The present invention relates to a carrier recovery circuit and a demodulation circuit under a quasi-coherent detection method in a digital radio communication system.

The present application claims priority on Japanese Patent Application No. 2009-254164 filed Nov. 5, 2009, the entire content of which is incorporated herein by reference.

BACKGROUND ART

Recently, various methods have been developed to improve the utilization efficiency of frequency bands and thereby achieve high-speed data communication in a digital radio communication system. For instance, methods of executing multi-valued digital modulation/demodulation according to modulation methods using phase information for data decision, such as quadrature amplitude modulation (QAM) and phase shift keying (PSK), have been known. In a modulation method using phase information for data decision, phase errors (phase noise) that occur in a transmitter and a receiver may cause degradation of a bit error rate (BER). A receiver using this modulation method may improve its bit error rate by performing phase error compensation (phase noise compensation).

FIG. 16 is a block diagram showing the constitution of a demodulation circuit 9 which is used in a receiver of a digital radio communication system.

The demodulation circuit 9 includes a reference oscillator 1001, a quadrature detector 1002, an A/D converter 1003, and a carrier recovery circuit 91. The carrier recovery circuit 91 includes a phase rotator 1004, a phase error detector 1005, a loop filter 1008, and a numerical control oscillator 1009. The carrier recovery circuit 91 configures a carrier recovery loop equivalent to a phase-locked loop (PLL).

The reference oscillator 1001 produces a reference signal having a fixed frequency. The quadrature detector 1002 performs quadrature detection on an IF input signal r91 (where IF stands for Intermediate Frequency) by use of the reference signal of the reference oscillator 1001, thus producing an in-phase channel (Ich) baseband signal and a quadrature-phase channel (Qch) baseband signal. The quadrature detector 1002 sends these baseband signals to the A/D converter 1003. Baseband signals of the quadrature detector 1002 may contain phase errors due to a phase difference between the intermediate frequency (IF) and the fixed frequency of the reference oscillator 1001. The A/D converter 1003 performs analog/digital conversion on baseband signals of the quadrature detector 1002 so as to send them to the phase rotator 1004.

The phase rotator 1004 performs phase error compensation by way of phase rotation on digital baseband signals from the A/D converter 1003, thus producing output signals r92 ascribed to an in-phase channel (Ich) and a quadrature channel (Qch). The phase error detector 1005 detects phase errors, which remain in Ich/Qch output signals r92, so as to produce a phase error signal representing a voltage value equivalent to detected phase errors. The loop filter 1008 eliminates unnecessary high-frequency components included in a phase error signal. The numerical control oscillator 1009 produces a sine-wave signal and a cosine-wave signal with a phase inverse to a phase indicated by a phase error signal that has passed through the loop filter 1008, thus sending them to the phase rotator 1004. The phase rotator 1004 performs phase error compensation on baseband signals based on a sine-wave signal and a cosine-wave signal from the numerical control oscillator 1009.

Since the loop filter 1008 eliminates unnecessary high-frequency components included in a phase error signal of the phase error detector 1005, it is possible to suppress short-term fluctuations of a sine-wave signal and a cosine-wave signal of the numerical control oscillator 1009 by way of the phase error compensation of the phase rotator 1004. That is, it is possible to stabilize the operation of the carrier recovery circuit 91 by way of a PLL loop. Herein, the loop filter 1008 needs to adopt optimum bandwidths which differ from each other depending on the magnitude of phase errors included in baseband signals of the quadrature detector 1002 and their modulation methods. For this reason, it is preferable to adjust the bandwidth of the loop filter 1008 based on the magnitude of phase errors and its modulation method.

Various methods have been known as methods for adjusting the bandwidth of the loop filter 1008. For instance, PLT 1 disclosed a digital satellite broadcasting transmitter/receiver, in which an error correction circuit measures a bit error rate so that a control circuit sets a loop filter coefficient based on a decision as to whether or not the bit error rate is higher than a predetermined threshold. PLT 2 disclosed a QAM carrier recovery circuit in which, upon estimating phase noise and additive noise, a user is able to optimize a loop bandwidth of a carrier wave based on the estimation result. PLT 3 disclosed a carrier recovery device that calculates phase errors based on coordinates of signal points (or constellation points) and coordinates of demodulated signals in a signal-point alignment (or a constellation) according to QAM or PSK. PLT 4 disclosed a carrier recovery circuit that determines phase lag or phase lead in carrier recovery by dividing a peripheral area, encompassing constellation points in a constellation of QAM, into four subdivisions.

CITATION LIST

Patent Literature

PLT 1: Japanese Patent Publication No. 2000-101666
PLT 2: Japanese Patent Publication No. 2003-531523
PLT 3: Japanese Patent Publication No. 2006-129536
PLT 4: Japanese Patent Publication No. H03-34746

SUMMARY OF INVENTION

Technical Problem

In a conventional receiver, a loop bandwidth, which is determined based on the largest phase error in a presumed range of phase errors irrespective of the magnitude of phase errors and its modulation method, is set to the loop filter 1008. Since a loop bandwidth, which is determined based on the largest phase error in a presumed range of phase errors, is set to the loop filter 1008 of a receiver with small phase errors (i.e. a receiver with good phase error characteristics), it is impossible to fully reflect bit error rate characteristics adapted to small phase errors.

PLT 1 allows a loop bandwidth to be set based on a bit error rate but degrades a bit error rate due to conditions of transmission paths between a transmitter and a receiver with small phase errors; this may lead to an incapability of setting optimum loop bandwidths. PLT 2 allows a user to optimize a loop bandwidth but cannot automatically set a loop bandwidth.

Additionally, PLT 2 did not disclose specifics of a user's optimization method of a loop bandwidth.

Solution To Problem

The present invention is made in consideration of the foregoing circumstances so that the present invention provides a carrier recovery circuit and a demodulation circuit under a quasi-coherent detection method with superior bit error rate characteristics.

The present invention relates to a carrier recovery circuit adapted to a demodulation circuit according to a quasi-coherent detection method. This carrier recovery circuit includes a phase rotator that rotates the phase of a baseband signal detected from a received signal; a phase error detector that detects a phase error included in a baseband signal with a rotated phase; an amplitude error detector that detects an amplitude error included in a baseband signal with a rotated phase; a loop filter that eliminates a high-frequency component from a phase error; a loop filter controller that controls a bandwidth of the loop filter based on a phase error and a amplitude error; and a phase rotation controller (or a numerical control oscillator) that controls the phase rotator based on a phase error eliminating its high-frequency component.

The loop filter controller expands the bandwidth of the loop filter when a difference between a phase error and an amplitude error is greater than a predetermined threshold, whilst the loop filter controller reduces the bandwidth of the loop filter upon determining that an amplitude error decreases due to a reduction of the bandwidth of the loop filter. Additionally, the loop filter controller determines that an amplitude error decreases due to a reduction of the bandwidth of the loop filter when a difference between an amplitude error and a minimum value among previous amplitude errors is greater than a predetermined threshold.

The carrier recovery circuit further includes: a secondary phase rotator that rotates the phase of a baseband signal detected from a received signal; a secondary phase error detector that detects a phase error included in a baseband signal whose phase is rotated by the secondary phase rotator; a secondary amplitude error detector that detects an amplitude error included in a baseband signal whose phase is rotated by the secondary phase rotator; a secondary loop filter that eliminates a high-frequency component from a phase error detected by the secondary phase error detector; and a secondary phase rotation controller that controls the secondary phase rotator based on a phase error whose high-frequency component is eliminated by the secondary loop filter. Herein, the loop filter controller sets different bandwidths to the loop filter and the secondary loop filters, so that it expands both the bandwidths of the loop filter and the secondary loop filter when a difference between a phase error of the phase error detector and an amplitude error of the amplitude error detector is greater than a predetermined threshold. Additionally, it determines that an amplitude error decreases due to a reduction of the bandwidth of the loop filter when a difference between an amplitude error of the amplitude error detector and an amplitude error of the secondary amplitude error detector is greater than a predetermined threshold, thus reducing both the bandwidths of the loop filter and the secondary loop filter.

A demodulation circuit according to the present invention includes a reference oscillator that carries out free-running oscillation on a reference signal with a reference frequency; a quadrature detector that demodulates a received signal having an intermediate frequency with a reference signal so as to generate baseband signals whose phases are orthogonal to each other; an A/D converter that performs A/D conversion on baseband signals; and a carrier recovery circuit. The carrier recovery circuit has the foregoing constitution and function.

A carrier recovery method of the present invention includes a phase rotating process for rotating the phase of a baseband signal detected from a received signal; a phase error detecting process for detecting a phase error included in a baseband signal with a rotated phase; an amplitude error detecting process for detecting an amplitude error included in a baseband signal with a rotated phase; and a loop filter control process for controlling the bandwidth of a loop filter based on a phase error and an amplitude error. Herein, it controls phase rotation based on a phase error whose high-frequency component is eliminated by the loop filter.

Advantageous Effects of Invention

According to the present invention, it is possible to improve bit error rate (BER) characteristics of a receiver in a digital radio communication system. Additionally, it is possible to achieve high-quality demodulation processing since it is possible to perform carrier recovery following variations of the C/N ratio.

DESCRIPTION OF EMBODIMENTS

The present invention will be described by way of embodiments with reference to the accompanying drawings. The present invention relates to a modulation method using phase information for data decision, such as QAM and PSK. The embodiments are each directed to a demodulation circuit that perform quasi-coherent detection on intermediate frequency input signals (IF input signals) so as to produce in-phase channel (Ich) baseband signals and quadrature-phase channel (Qch) baseband signals, in which a carrier recovery circuit having a loop filter eliminates phase errors and amplitude errors from baseband signals. Although the embodiments adopt 16 QAM, it is possible to adopt another modulation method that is able to perform a data decision based on phase information. The quasi-coherent detection method performs phase detection using frequency signals with a fixed frequency, which is produced by the demodulation circuit, and does not need to produce signals perfectly synchronized with carrier waves; hence, the quasi-coherent detection method has been widely used. A first embodiment is made on the presupposition that a carrier to noise ratio (C/N) of a received signal is set to a fixed value, whilst a second embodiment copes with variable values of C/N.

First Embodiment

Figure 1:
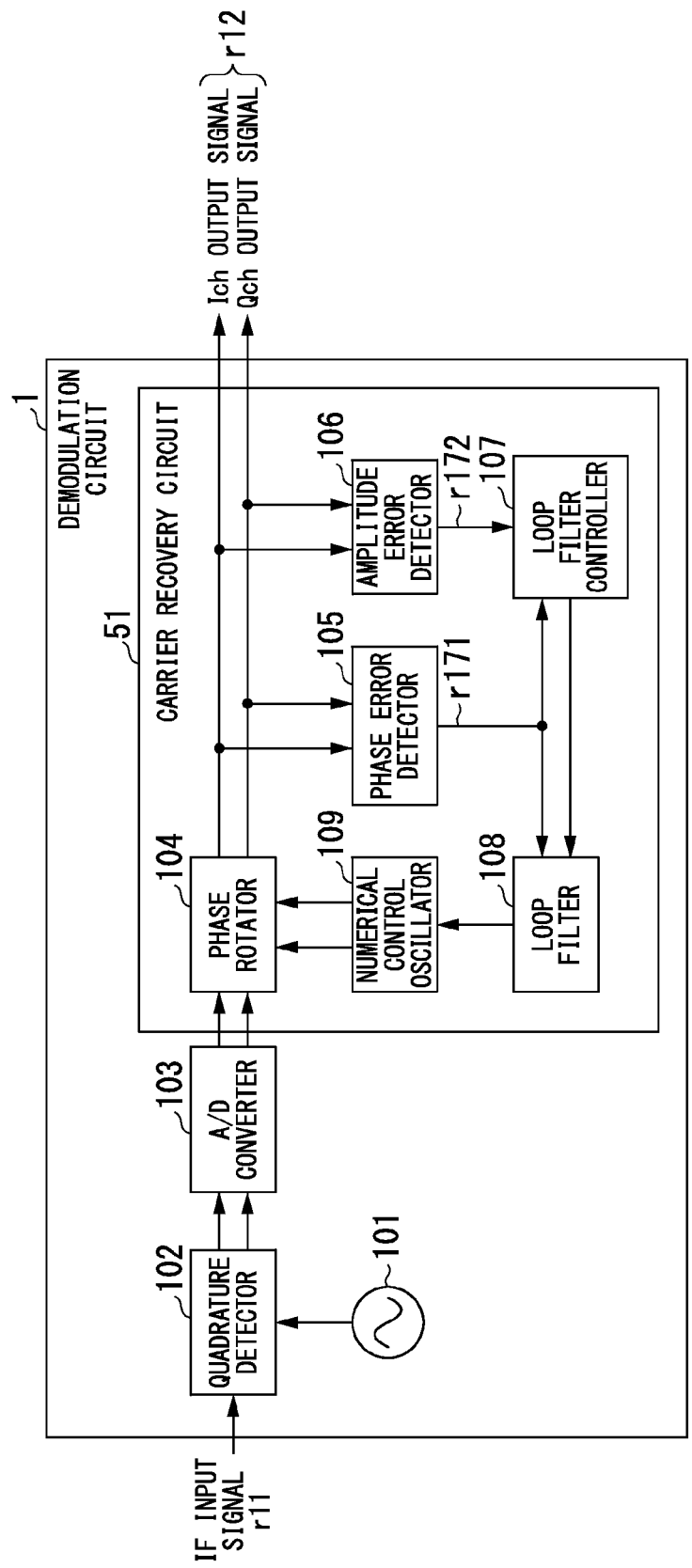
FIG. 1 A block diagram showing the constitution of a demodulation circuit according to a first embodiment of the present invention.

FIG. 1 is a block diagram showing the constitution of a demodulation circuit 1 according to a first embodiment of the present invention. The demodulation circuit 1 includes a reference oscillator 101, a quadrature detector 102, an A/D converter 103, and a carrier recovery circuit 51. The carrier recovery circuit 51 includes a phase rotator 104, a phase error detector 105, an amplitude error detector 106, a loop filter controller 107, a loop filter 108, and a numerical control oscillator (or a phase rotation controller) 109. The carrier recovery circuit 51 configures a carrier recovery loop equivalent to a PLL loop.

The reference oscillator 101 carries out free-running oscillation at a reference oscillation frequency (i.e. a fixed frequency) close to an oscillation frequency of a modulator so as to generate a frequency signal having the reference oscillation frequency, which is sent to the quadrature detector 102. The quadrature detector 102 performs quadrature detection, using a frequency signal of the reference oscillator 101, on an intermediate frequency input signal (IF input signal), thus producing an in-phase channel (Ich) baseband signal and a quadrature-phase channel (Qch) baseband signal, which are mutually orthogonal to each other. Since the reference oscillation frequency of the reference oscillator 101 slightly differs from the oscillation frequency of a modulator, an Ich baseband signal and a Qch baseband signal may include phase rotation (or phase error) equivalent to a difference frequency between the reference oscillation frequency and the intermediate frequency (IF). The quadrature detector 102 sends an Ich baseband signal and an Qch baseband signal to the A/D converter 103.

The A/D converter 103 performs analog/digital conversion on an Ich baseband signal and a Qch baseband signal, thus sending them to the phase rotator 104 of the carrier recovery circuit 51. The demodulation circuit 51 performs its demodulation process by way of digital signal processing of the carrier recovery circuit 51.

The phase rotator 104 performs phase error compensation on an Ich baseband signal and a Qch baseband signal in digital formats based on a sine-wave signal and a cosine-wave signal produced by the numerical control oscillator 109, thus producing an Ich output signal and a Qch output signal (which are baseband signals already subjected to phase error compensation) (hereinafter, referred to as output signals r12). Output signals r12 produced by the phase rotator 104 are supplied to an external circuit (not shown) and also delivered to the phase error detector 105 and the amplitude error detector 106.

The phase error detector 105 detects phase errors included in output signals r12 of the phase rotator 104. The phase error detector 105 sends a phase error signal, representing a voltage value equivalent to the detected phase errors, to the loop filter controller 107 and the loop filter 108. The amplitude error detector 106 detects amplitude errors included in output signals r12 of the phase rotator 104. The amplitude error detector 106 sends an amplitude error signal, representing a voltage value equivalent to the detected phase errors, to the loop filter controller 107.

The loop filter 108 eliminates unnecessary high-frequency components from a phase error signal of the phase error detector 105, thus sending its result to the numerical control oscillator 109. The numerical control oscillator 109, including a voltage-controlled oscillator (VCO), generates a sine-wave signal and a cosine-wave signal with an inverse phase (hereinafter, referred to phase rotation control signals) based on the phase error signal in which unnecessary high-frequency components are eliminated by the loop filter 108. The numerical control oscillator 109 controls phase rotation of the phase rotator 104 based on phase rotation control signals. The loop filter controller 107 controls a bandwidth of the loop filter based on a phase error signal of the phase error detector 105 and an amplitude error signal of the amplitude error detector 106.

Figure 2:
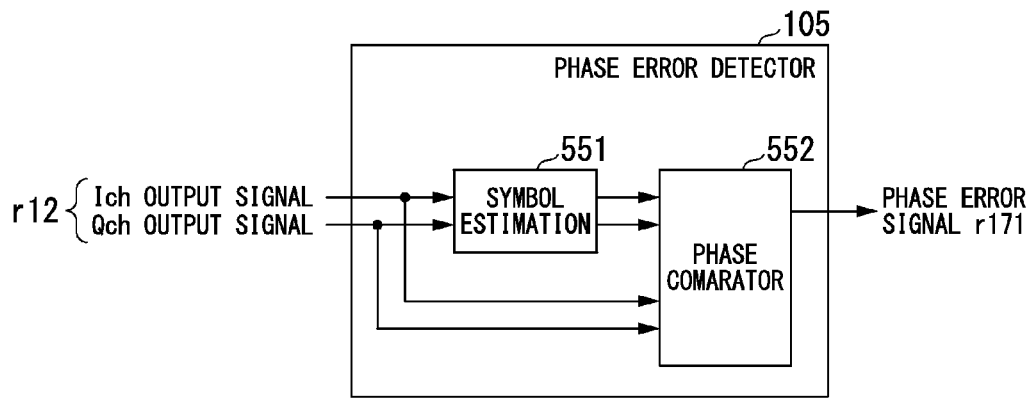
FIG. 2 A block diagram showing the constitution of a phase error detector which is a constituent element of the demodulation circuit.

FIG. 2 is a block diagram showing the constitution of the phase error detector 105. The phase error detector 105 includes a symbol estimation part 551 and a phase comparator 552. The symbol estimation part 105 selects constellation points corresponding to output signals r12 from a constellation based on a modulation method employed between a transmitter and a receiver, thus sending their coordinates to the phase comparator 552. The phase comparator 552 compares coordinates of an IF input signal r11 with coordinates of constellation points selected by the symbol estimation part 551 so as to calculate phase errors of the IF input signal r11, thus forwarding a phase error signal r171.

Figure 3:
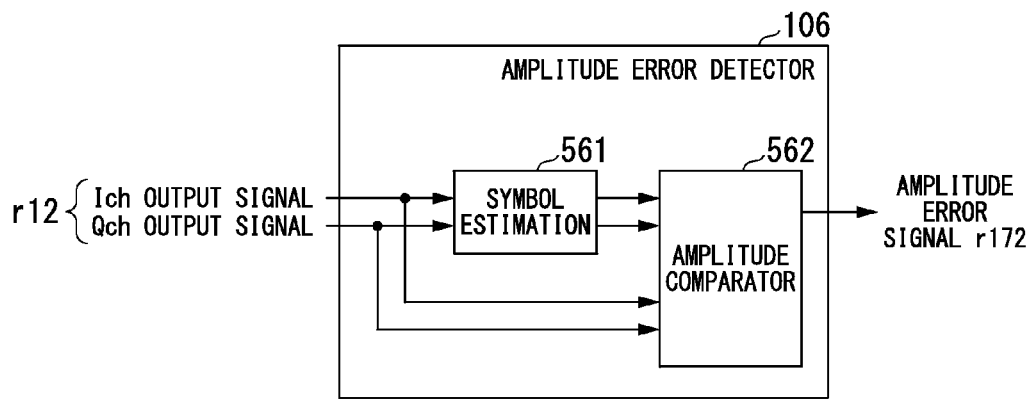
FIG. 3 A block diagram showing the constitution of an amplitude error detector which is a constituent element of the demodulation circuit.

FIG. 3 is a block diagram showing the constitution of the phase error detector 106. The phase error detector 106 includes a symbol estimation part 561 and an amplitude comparator 562. Similar to the symbol estimation part 551 of FIG. 2, the symbol estimation part 561 selects constellation points corresponding to output signals r12 from a constellation based on a modulation method employed between a transmitter and a receiver, thus sending their coordinates to the amplitude comparator 562. The amplitude comparator 562 compares coordinates of an IF input signal r11 with coordinates of signal points selected by the symbol estimation part 561 so as to calculate amplitude errors of the IF input signal r11, thus forwarding an amplitude error signal r172.

Figure 4:
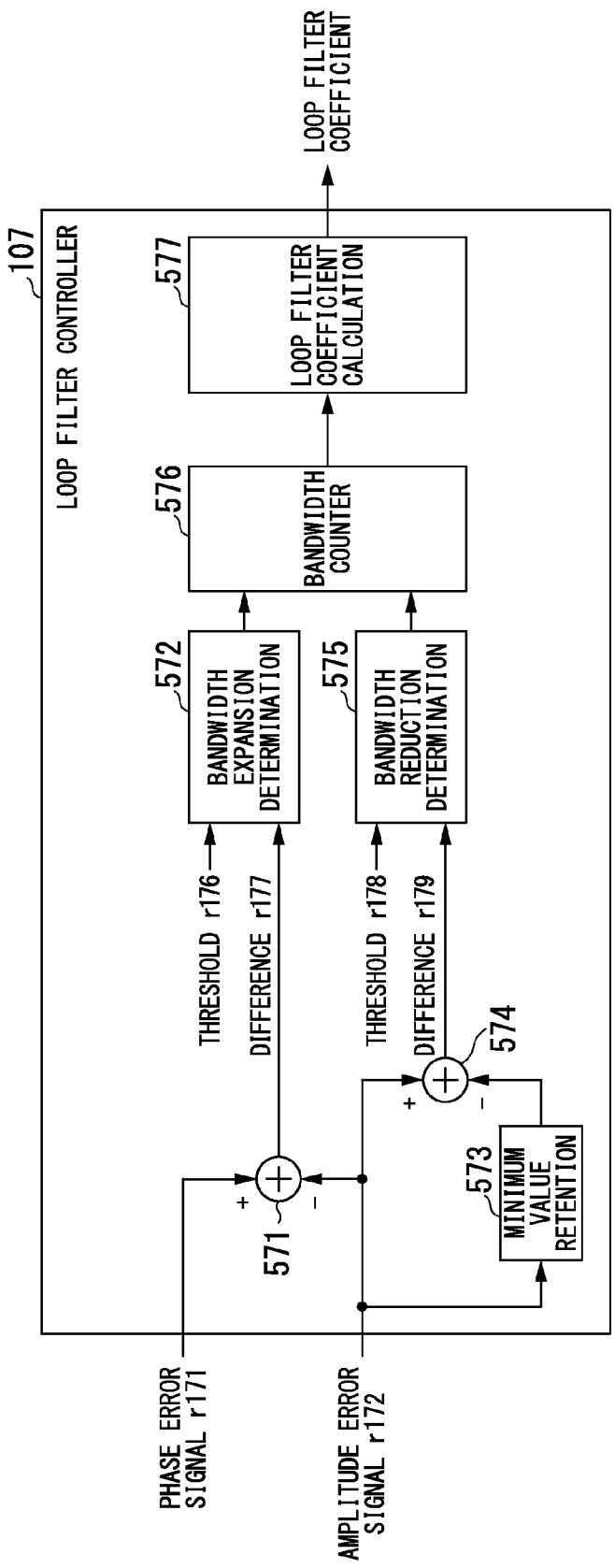
FIG. 4 A block diagram showing the constitution of a loop filter controller which is a constituent element of the demodulation circuit.

FIG. 4 is a block diagram showing the constitution of the loop filter controller 107. The loop filter controller 107 includes a minimum value retention part 573, subtracters 571, 574, a bandwidth expansion determination part 572, a bandwidth reduction determination part 575, a bandwidth counter 576, and a loop filter coefficient calculation part 577. The minimum value retention part 573 stores a minimum value of an amplitude error signal r172 from the amplitude error detector 106. Additionally, the minimum value retention part 573 is able to arbitrarily forward the minimum value of the amplitude error signal r172 to the subtracter 574. The subtracter 571 subtracts an amplitude error signal r172 from a phase error signal r171, thus sending a difference r177 therebetween to the bandwidth expansion determination part 572. The subtracter 574 subtracts the minimum value of the amplitude error signal r172 from the amplitude error signal r172, thus sending a difference r179 therebetween to the bandwidth reduction determination part 575.

The bandwidth expansion determination part 572 compares the difference r177 of the subtracter 571 with a pre-stored threshold r176 so as to determine whether or not to expand the bandwidth of the loop filter 108. Upon determining expansion of the bandwidth of the loop filter 108, the bandwidth expansion determination part 572 sends a signal declaring expansion of the bandwidth of the loop filter 108 (i.e. a bandwidth expansion signal) to the bandwidth counter 576.

The bandwidth reduction determination part 575 compares a difference r179 of the subtracter 574 with a pre-stored threshold r178 so as to determine whether or not to reduce the bandwidth of the loop filter 108. Upon determining a reduction of the bandwidth of the loop filter 108, the bandwidth reduction determination part 575 sends a signal declaring a reduction of the bandwidth of the loop filter 108 (i.e. a bandwidth reduction signal) to the bandwidth counter 576.

The bandwidth counter 576 produces a count value representative of the bandwidth of the loop filter 108 in response to a bandwidth expansion signal or a bandwidth reduction signal. The loop filter coefficient calculation part 577 produces and forwards a loop filter coefficient defining the bandwidth of the loop filter 108 based on the count value of the bandwidth counter 576.

Next, details of phase errors (phase noise), additive errors (additive noise), and amplitude errors (amplitude noise) will be described.

Figure 5:
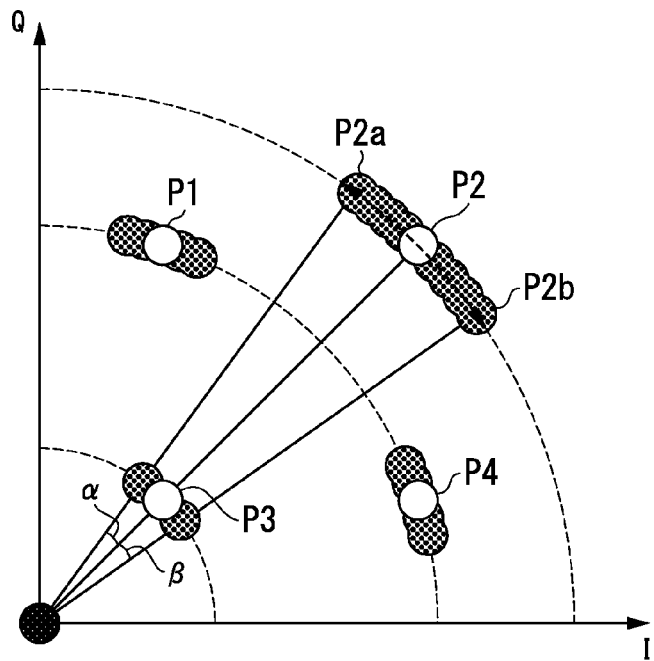
FIG. 5 A graph showing a first quadrature of a constellation of 16 QAM, indicating signals including phase errors on an I-Q plane.

FIG. 5 is a graph plotting signals including phase errors on an I-Q plane (i.e. a coordinates plane in which a horizontal axis represents Ich whilst a vertical axis represents Qch). It shows a first quadrature of a constellation of 16 QAM. P1 through P4 denote constellation points of 16 QAM, whilst P2a and P2b denote signals corresponding to phase errors included in a constellation point P2. A constellation point P2a advances in phase rather than the constellation point P2 by an angle α, whilst a constellation point P2b delays in phase rather than the constellation point P2 by an angle β. That is, a phase error is recognized as an angle of positional deviation with respect to a constellation point relative to an original signal, so that a phase error occurs due to a deviation between a carrier frequency and an oscillation frequency at a modulation side and/or a demodulation side. In the demodulation circuit 1, a phase error occurs due to a deviation between an IF input signal r11 and a reference frequency of the reference oscillator 101. Additionally, additive errors may include phase errors. The following description refers to "pure phase errors" as phase errors that occur due to deviations between a carrier frequency and an oscillation frequency, wherein pure phase errors do not associate with amplitude errors.

Figure 6:
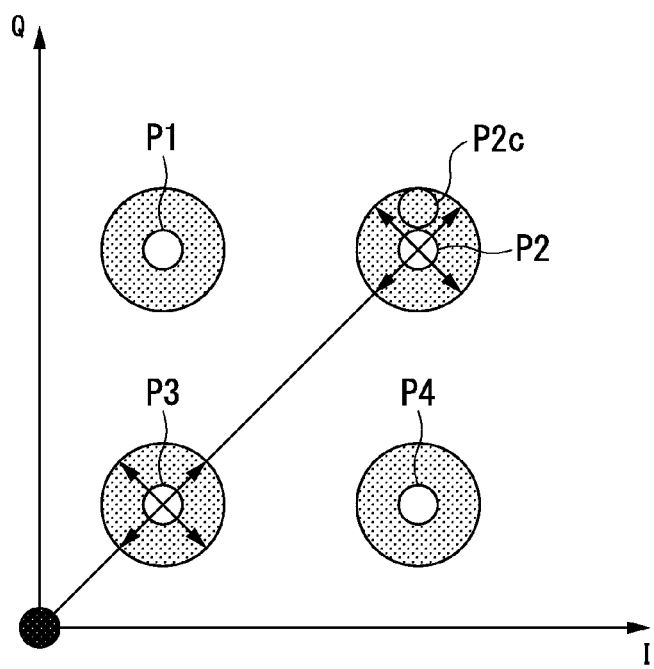
FIG. 6 A graph showing a first quadrature of a constellation of 16 QAM, indicating signals including additive errors on an I-Q plane.

FIG. 6 is a graph plotting signals including additive errors on an I-Q plane. Similar to FIG. 5, FIG. 6 shows a first quadrature of a constellation of 16 QAM. Herein, P1 through P4 denote constellation points of 16 QAM, wherein P2c denotes an additive error included in a constellation point P2. Additive errors are non-directional errors such as thermal noise, so that additive errors may include both of phase errors and amplitude errors.

Figure 7:
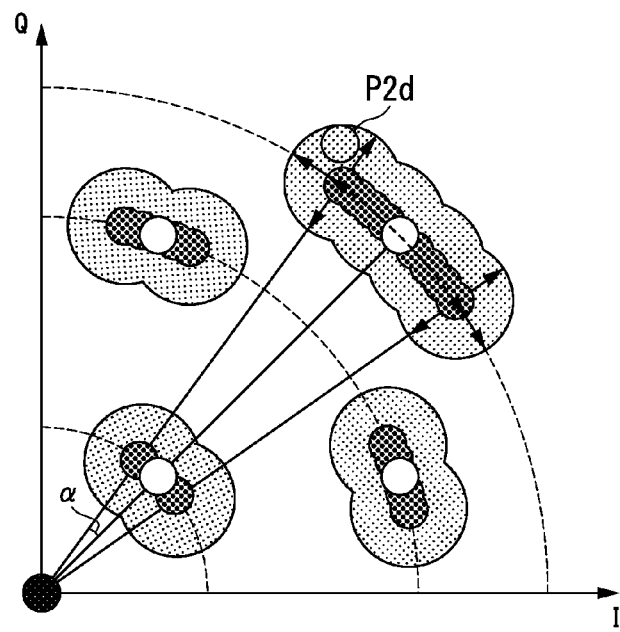
FIG. 7 A graph showing a first quadrature of a constellation of 16 QAM, indicating signals including pure phase errors and additive errors on an I-Q plane.

FIG. 7 is a graph plotting signals including pure phase errors and additive errors on an I-Q plane. Similar to FIG. 5, FIG. 7 shows a first quadrature of a constellation of 16 QAM. Herein, P1 through P4 denote constellation points of 16 QAM, wherein P2d indicate both of phase errors and additive errors included in a constellation point P2. Due to pure phase errors, a constellation point P2d advances in phase than the constellation point P2 by an angle α and further undergoes phase/amplitude deviations due to additive errors. Thus, when a constellation point shifts its position due to pure phase errors and additive errors, amplitude deviations may occur due to additive errors, whilst phase errors may occur due to both of pure phase errors and additive errors. As shown in FIG. 6, phase deviations may match with amplitude deviations when additive errors solely remain irrespective of elimination of pure phase errors. To eliminate phase errors, it is necessary to expand the bandwidth of the loop filter 108; but expanding the bandwidth of the loop filter 108 may degrade a C/N ratio due to inclusion of noise that occurs in the phase error detector 105. To eliminate additive noise that occurs in the phase error detector 105, it is necessary to reduce the bandwidth of the loop filter 108, thus minimizing amplitude errors. Thus, it is necessary to optimize the bandwidth of the loop filter 108 by way of expansion/reduction.

Figure 8:
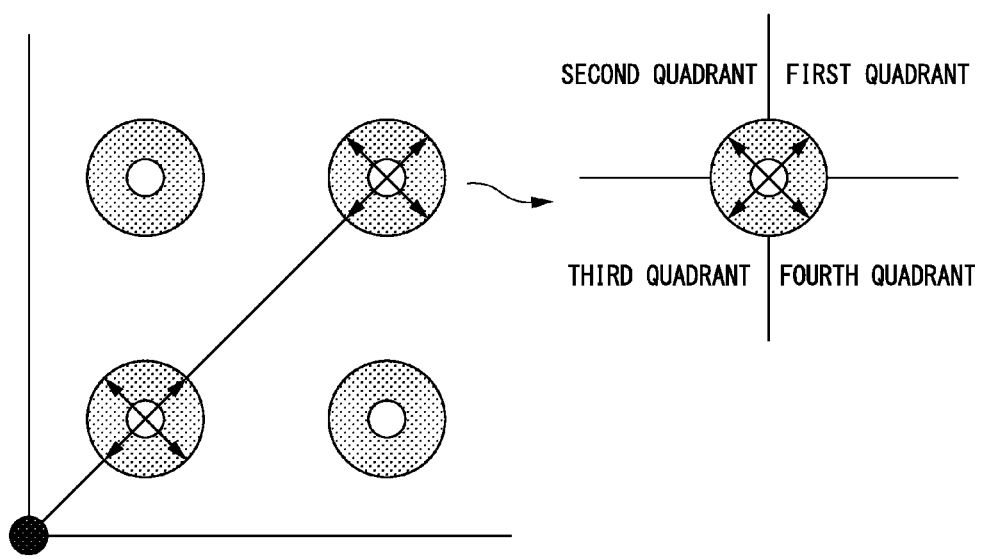
FIG. 8 A graph showing a first quadrature of a constellation of 16 QAM, indicating that noise components are included in all the fourth quadrature of peripheral areas with respect to constellation points of Ich/Qch output signals solely including additive noise.

FIG. 8 is a graph in which a peripheral area of each constellation point is subdivided into four quadrants, indicating that noise components are included in all quadrants with respect to each of constellation points corresponding to Ich/Qch output signals r12 solely including additive noise. That is, through statistic observation upon setting local coordinates parallel to an I-Q plane about an origin corresponding to each constellation point, as shown in FIG. 8, it is observed that noise components are included at the same ratio in all quadrants with respect to Ich/Qch output signals r12 solely including additive noise. Herein, noise components are each relevant to a distance between a reference constellation point and an Ich/Qch output signal r12 on an I-Q plane.

Figure 9:
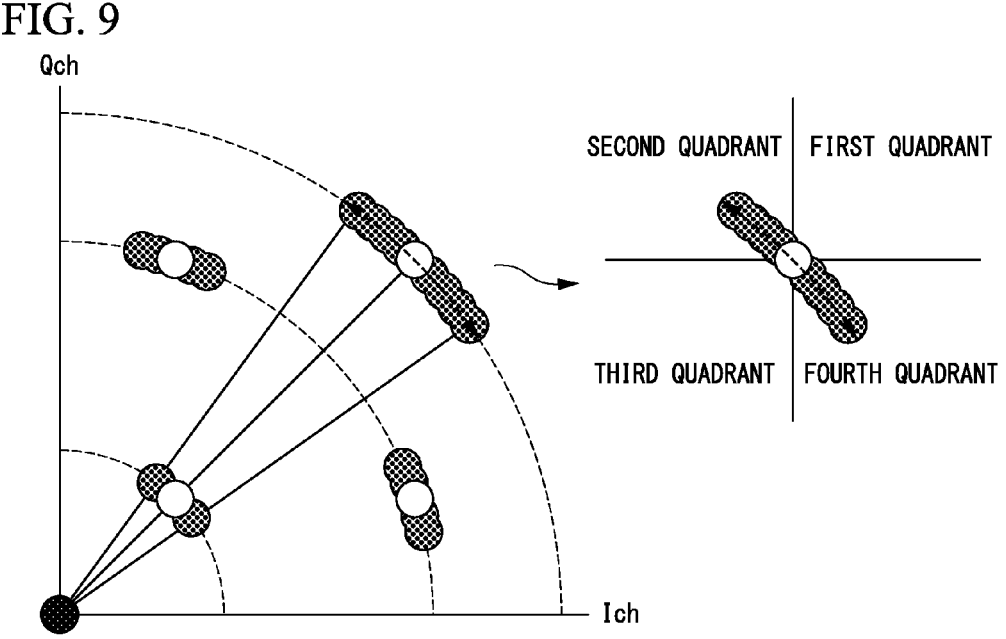
FIG. 9 A graph showing a first quadrature of a constellation of 16 QAM, indicating that noise components are included in the second quadrature of peripheral areas with respect to constellation points of Ich/Qch output signals solely including pure phase errors.

FIG. 9 is a graph in which a peripheral area of each constellation point is subdivided into four quadrants, indicating that noise components are included in second and fourth quadrants among four quadrants surrounding each of constellation points corresponding to Ich/Qch output signals r12 solely including pure phase errors. That is, noise components occur in second and fourth quadrants in a peripheral area surrounding each of constellation points corresponding to Ich/Qch output signals r12 solely including pure phase errors. Therefore, noise components increase in second and fourth quadrants in a peripheral area surrounding each of constellation points corresponding to Ich/Qch output signals r12 including pure phase errors and Ich/Qch output signals r12 including pure phase errors and additive errors. In other words, it is possible to determine whether Ich/Qch output signals r12 include pure phase errors or they include both of pure phase errors and additive errors by comparing noise components in quadrants of a peripheral area surrounding each of constellation points corresponding to Ich/Qch output signals r12. Considering this analysis result, the amplitude error detector 105 detects amplitude errors as distances between constellation points in first and third quadrants, ascribed to a peripheral area surrounding each constellation point, and an origin on an I-Q plane.

Figure 10:
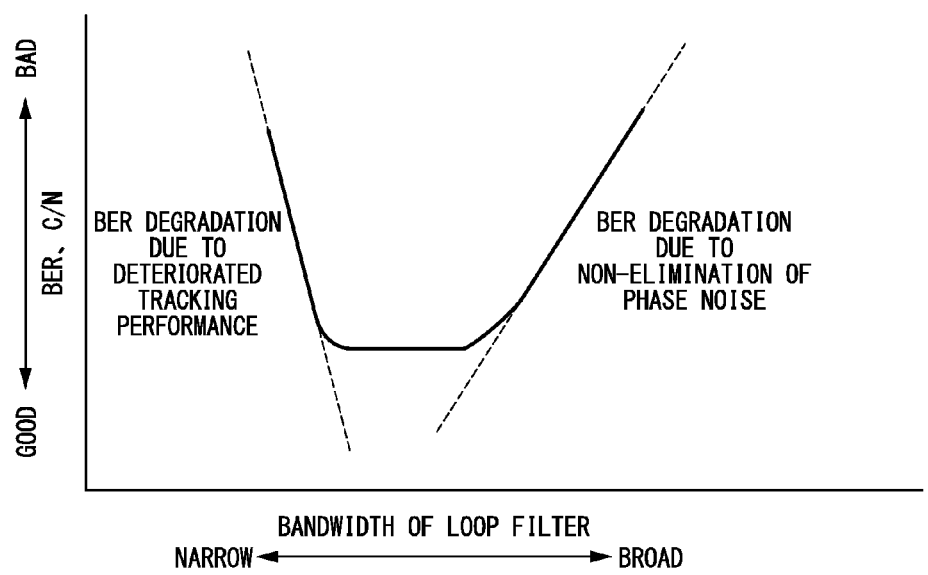
FIG. 10 A graph showing the relationship between a bandwidth and a BER of a loop filter, which is a constituent element of the demodulation circuit, as well as the C/N ratio.

FIG. 10 is a graph showing the relationship between the bandwidth of the loop filter 108, the bit error rate (BER), and the C/N ratio. In this connection, the relationship between the bandwidth of the loop filter 108, the BER, and the C/N ratio according to the present embodiment is similar to the relationship which is established with regard to a conventional loop filter.

As shown in FIG. 10, a narrow bandwidth of the loop filter 108 decreases a response speed so that a carrier recovery loop may not fully follow phase variations, thus degrading the C/N ratio. For instance, when a miss-locking state of PLL occurs due to fluctuations of the reference frequency of the reference oscillator 101 caused by temperature variations, the loop filter 108 with a narrow bandwidth may slow down variations of its output voltage, it takes a long time to reestablish a locking state of PLL. On the other hand, the loop filter 108 with a broad bandwidth may degrade the C/N ratio because it is impossible to eliminate unnecessary high-frequency components included in a phase error signal produced by the phase error detector 105. That is, the loop filter 108 with a very small bandwidth or a very broad bandwidth may degrade the C/N ratio. In general, a loop filter with a broad bandwidth demonstrates good performance of tracking carrier waves; hence, it is preferable to adjust a bandwidth within a certain range not causing degradation of the C/N ratio. Additionally, the C/N ratio is connected to additive noise, which in turn causes amplitude errors in addition to phase errors. Thus, it is possible to determine whether or not the C/N ratio degrades based on amplitude errors.

Next, the demodulation processing of the demodulation circuit 1 will be described with reference to a flowchart show in FIG. 11.

In step S11, the reference oscillator 101 carries out free-running oscillation at a reference frequency so as to generate a reference signal and send it to the quadrature detector 102.

In step S12, the quadrature detector 102 demodulates an IF input signal r11, which is supplied to the demodulation circuit 1, with the reference signal so as to generate an Ich baseband signal and a Qch baseband signal, whose phases are orthogonal to each other, thus sending them to the A/D converter 103.

In step S13, the A/D converter 103 performs A/D conversion on an Ich baseband signal and an Qch baseband signal, produced by the quadrature detector 102, thus sending them to the phase rotator 104.

In step S14, the phase rotator 104 performs phase error correction by way of phase rotation implemented on the Ich baseband signal and the Qch baseband signal which have been already subjected to A/D conversion. The phase rotator 104 forwards phase error-corrected Ich/Qch baseband signals as Ich/Qch output signals r12 to an external circuit while sending them to the phase error detector 105 and the amplitude error detector 106.

In step S15, the phase error detector 105 detects phase errors that remain in Ich/Qch output signals r12 from the phase rotator 104. Specifically, the symbol estimation part 551 of the phase error detector 105 calculates minimum square errors between coordinates of Ich/Qch output signals r12 and coordinates of each of constellation points on an I-Q plane, thus selecting a constellation point with the smallest minimum square error. The symbol estimation part 551 forwards coordinates of the selected constellation point on the I-Q plane to the phase comparator 552.

The phase comparator 552 subtracts coordinates of the constellation point selected by the symbol estimation part 551 from coordinates of Ich/Qch output signals r12, thus producing noise vectors. When a noise vector includes a positive Ich component and a negative Qch component (i.e. in case of a fourth quadrant in FIG. 9), or when a noise vector includes a negative Ich component and a positive Qch component (i.e. in case of a second quadrant in FIG. 9), the phase comparator 552 calculates a length of the noise vector (i.e. a distance between the selected constellation point and the Ich/Qch output signal) as a phase error, which is sent to the loop filter controller 107. Additionally, the phase comparator 552 divides the length of a noise vector by an amplitude value so as to approximately calculate an angle of a phase error, which is sent to the loop filter 108. Herein, it produces a positive angle in case of phase lead (i.e. in case of the second quadrant in FIG. 9) or a negative angle in case of phase lag (i.e. in case of the fourth quadrant in FIG. 9). When a noise vector includes an Ich component and a Qch component both of which are positive (i.e. in case of a first quadrature in FIG. 9), or when a noise vector includes an Ich component and a Qch component both of which are negative (i.e. in case of a third quadrature in FIG. 9), the phase comparator 552 does not produce a phase error signal r171.

In step S15, the amplitude error detector 106 detects amplitude errors included in Ich/Qch output signals r12 of the phase rotator 104. Specifically, similar to the symbol estimation part 551 of the phase error detector 105, the symbol estimation part 561 of the amplitude error detector 106 selects a constellation point so as to send its coordinates to the amplitude comparator 562. The amplitude comparator 562 subtracts coordinates of the constellation point selected by the symbol estimation part 561 from coordinates of Ich/Qch output signals r12, thus producing a noise vector. When a noise vector includes an Ich component and a Qch component both of which are positive (i.e. in case of a first quadrant in FIG. 9), or when a noise vector includes an Ich component and a Qch component both of which are negative (i.e. in case of a third quadrant in FIG. 9), the amplitude comparator 562 calculates the length of the noise vector as an amplitude error, which is sent to the loop filter controller 107. On the other hand, when a noise vector includes a positive Ich component and a negative Qch component (i.e. in case of a fourth quadrant in FIG. 9), or when a noise vector includes a negative Ich component and a positive Qch component (i.e. in case of a second quadrant in FIG. 9), the amplitude comparator 562 does not produce an amplitude error signal r172.

In step S16, the loop filter controller 107 generates a loop filter coefficient, indicating the bandwidth of the loop filter 108, based on the phase error signal r171 and the amplitude error signal r172, thus controlling the bandwidth of the loop filter 108. In the loop filter controller 107, the subtracter 571 subtracts the amplitude error signal r172 from the phase error signal r171 so as to calculate a difference r177 therebetween, which is sent to the bandwidth expansion determination part 572. When the difference r177 is greater than a predetermined threshold r176, the bandwidth expansion determination part 572 sends a bandwidth expansion signal, indicating expansion of the bandwidth of the loop filter 108, to the bandwidth counter 576. On the other hand, the bandwidth expansion determination part 572 does not produce the bandwidth expansion signal when the difference r177 is equal to or less than the threshold r176.

In the loop filter controller 107, the minimum value retention part 573 stores the minimum value of amplitude errors indicated by the amplitude error signal r172. Specifically, the minimum value retention part 573 compares the amplitude error signal r172 with the pre-stored minimum value so as to set the pre-stored minimum value as a minimum value of the amplitude error signal r172 when the amplitude error signal r172 is smaller than the pre-stored minimum value. The minimum value retention part 573 arbitrarily sends its minimum value to the subtracter 574. The subtracter 574 sends a difference r179, which is produced by subtracting the minimum value from the amplitude error signal r172, to the bandwidth reduction determination part 575. The bandwidth reduction determination part 575 compares the difference r179 with a predetermined threshold r178. It is expected to minimize amplitude errors (i.e. improve a C/N ratio in FIG. 10) by reducing the bandwidth of the loop filter 108 when the difference r179 is greater than the threshold r178. Considering the fact that amplitude errors decrease due to a reduction of the bandwidth of the loop filter 108, the bandwidth reduction determination part 575 sends a bandwidth reduction signal to the bandwidth counter 576. On the other hand, the bandwidth reduction determination part 575 does not produce a bandwidth reduction signal when the difference r179 is equal to or less than the threshold r178.

The bandwidth counter 576 stores a count value, representing the bandwidth of the loop filter 108, therein, so that it changes the count value based on a bandwidth expansion signal or a bandwidth reduction signal, thus changing the bandwidth of the loop filter 108. Specifically, the bandwidth counter 576 increases its count value in response to a bandwidth expansion signal produced by the bandwidth expansion determination part 572. Alternatively, the bandwidth counter 576 decreases its count value in response to a bandwidth reduction signal produced by the bandwidth reduction determination part 575. The bandwidth counter 576 sends the increased or decreased count value to the loop filter coefficient calculation part 577.

Upon concurrently receiving both the bandwidth expansion signal and the bandwidth reduction signal, the bandwidth counter 576 executes a process based on a predetermined priority order so as to prevent a deadlock state due to collision between instructions for increasing and decreasing the count value. In this connection, it is possible to execute a bandwidth expansion process or a bandwidth reduction process at first.

The loop filter coefficient calculation part 577 determines a loop filter coefficient of the loop filter 108 based on the count value of the bandwidth counter 576. For instance, the loop filter coefficient calculation part 577 may store a function for converting a count value into a loop filter coefficient in advance, thus calculating the loop filter coefficient based on the function. Alternatively, the loop filter coefficient calculation part 577 may store a lookup table in advance, thus determining a loop filter coefficient with reference to the lookup table. The loop filter coefficient calculation part 577 sends its loop filter coefficient to the loop filter 108.

Since the phase error detector 105 of FIG. 2 or the amplitude error detector 106 of FIG. 3 sends a phase error signal r171 or an amplitude error signal r172 to the loop filter controller 107, the subtracter 571 cannot appropriately calculate a difference r177 therebetween. For this reason, the loop filter controller 107 needs to store an average among phase error signals r171 which were received in the past and an average among amplitude error signals r172 which were received in the past. Thus, the subtracter 571 is able to calculate a difference r177 between a phase error signal r171 and an amplitude error signal r172. Alternatively, the loop filter controller 107 may store a previously received phase error signal r181 and a previously received amplitude error signal r172, so that the loop filter controller 107 can use the previously received phase error signal r171 or the previously received amplitude error signal r172 when it fails to currently receive either a phase error signal r171 or an amplitude error signal r172.

In step S17, a bandwidth corresponding to a loop filter coefficient of the loop filter controller 107 is set to the loop filter 108, so that the loop filter 108 eliminates unnecessary high-frequency components from a phase error signal. The loop filter 108 sends a phase error signal, from which unnecessary high-frequency components have been eliminated, to the numerical control oscillator 109.

In step S18, the numerical control oscillator 109 generates a sine-wave signal and a cosine-wave signal with an inverse phase based on a phase error signal from the loop filter 108, thus sending them to the phase rotator 104. The phase rotator 104 performs phase rotation (see step S14) based on a sine-wave signal and a cosine-wave signal with an inverse phase. The demodulation circuit 1 continuously executes the foregoing demodulation processing on IF input signals.

In this connection, the phase error detector 105 and the amplitude error detector 106 may calculate a phase error index and an amplitude error index in accordance with arbitrary methods other than the foregoing methods.

Figure 12:
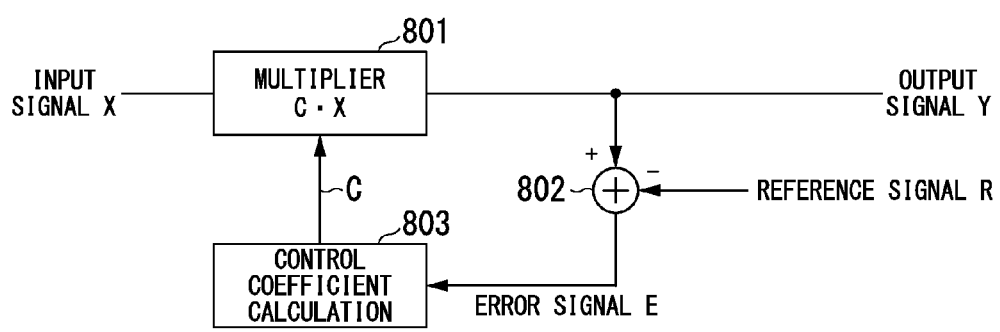
FIG. 12 A block diagram showing the constitution of a loop control circuit that calculates a phase error index and an amplitude error index.

FIG. 12 is a block diagram showing the constitution of a loop control circuit that calculates a phase error index and an amplitude error index. The loop control circuit includes a multiplier 801, a subtracter 802, and a control efficiency calculation part 803, wherein it multiplies an input signal X by a control coefficient C so as to provide an output signal Y which matches a reference signal R.

Specifically, the multiplier 801 multiplies an input signal X by a control coefficient C so as to produce an output signal Y, which is supplied to the subtracter 801 and an external circuit (not shown). The subtracter 802 subtracts the reference signal R from the output signal Y so as to produce an error signal E, which is sent to the control coefficient calculation part 803. The control coefficient calculation part 803 calculates the control coefficient C based on the error signal E produced by the subtracter 802, thus sending it to the multiplier 801. Herein, the error signal E is expressed by Equation 1.

$$E = Y - R = CX - R \qquad \text{[Equation 1]}$$

By solving Equation 1 with respect to the control coefficient C, it is possible to calculate phase control information and amplitude control information, which can be used as a phase error signal r171 and an amplitude error signal r172. The control coefficient C is calculated using Equation 2 differentiating a complex error function E.

$$|E|^2 = E \cdot E^* \qquad \text{[Equation 2]}$$

$$\frac{\partial}{\partial C}(E \cdot E^*) = E \cdot \frac{\partial}{\partial C} E \cdot E^* =$$

$$E \cdot \left(\frac{\partial}{\partial C_r} E^* + j \frac{\partial}{\partial C_i} E^*\right) + \left(\frac{\partial}{\partial C_r} E + j \frac{\partial}{\partial C_i} E\right) \cdot E^* =$$

$$E \cdot (X^* + j(-j) \cdot X^*) + (X + j^2 X) \cdot E^* =$$

$$E \cdot (X^* + X^*) = 2E \cdot X^*$$

$$\therefore C_{t+1} = C_t - \alpha \cdot E \cdot X^*$$

Herein, E* denotes a complex conjugate of E; $C_r$, $C_i$ denote a real term and an imaginary term of function C; t denotes time; and j denotes an imaginary unit. Additionally, α denotes a constant term. According to Equation 2, C is expressed by Equation 3.

$$C = \int (C_{t+1} - C_t) dt$$

$$C = \int E \cdot X^* dt \qquad \text{[Equation 3]}$$

On the other hand, a complex number C can be expressed in polar coordinates expression according to Equation 4.

$$C = r \cdot \exp(j\theta) = r \cdot \cos\theta + jr \cdot \sin\theta \quad \text{[Equation 4]}$$

Herein, r is expressed by Equation 5 when θ is sufficiently small (i.e. when a phase difference between the output signal Y and the reference signal R is small).

$$r \approx \int Re(E \cdot X^*) dt \quad \text{[Equation 5]}$$

Furthermore, θ can be expressed by Equation 6 when r is approximately "1" (i.e. when an amplitude difference between the output signal Y and the reference signal R is small).

$$\theta \approx \int Im(E \cdot X^*) dt \quad \text{[Equation 6]}$$

With respect to the control coefficient C, an amplitude component r can be calculated using Equation 5 whilst a phase component θ can be calculated using Equation 6. Herein, assuming that R=X (i.e. when noise included in the input signal X is small), the phase control information θ can be expressed by Equation 7 on condition that R=Di+jDq (where Di denotes a real part, and Dq denotes an imaginary part in the reference signal R), and E=Ei+jEq (where Ei denotes a real part, and Eq denotes an imaginary part in the error signal E).

$$\theta = Di \cdot Eq - Dq \cdot Ei \quad \text{[Equation 7]}$$

Additionally, the amplitude control information r can be expressed by Equation 8.

$$r = Di \cdot Ei - Dq \cdot Eq \quad \text{[Equation 8]}$$

Thus, the phase error detector 105 calculates phase control information θ as a phase error index in accordance with Equation 7. Additionally, the amplitude error detector 106 calculates amplitude control information r as an amplitude error index in accordance with Equation 8. By using the foregoing loop control circuit and its calculation method, it is possible to concurrently generate a phase error signal r171 and an amplitude error signal r172 and send them to the loop filter 108, so that it is unnecessary for the loop filter controller 107 to calculate and store an average of the phase error signal r171 and the amplitude error signal r172.

In the carrier recovery circuit 51, the loop filter controller 107 controls the bandwidth of the loop filter 108 based on the phase error signal r171 and the amplitude error signal r172, so that it is possible to improve bit error rate (BER) characteristics by optimizing the bandwidth.

There is a known method for estimating phase errors and amplitude errors, which utilizes a minimum square error between an input signal, correlated to a constellation point with the maximum amplitude in QAM, and the constellation point as well as a minimum square error between an input signal, correlated to a constellation point with the minimum amplitude, and the constellation point. This known method solely utilizes an input signal correlated to a constellation point with the maximum amplitude or a constellation point with the minimum amplitude; hence, it is not practical because it may decrease the number of samples while increasing the number of input signals which are not used in a modulation method with high multi-values. Additionally, the known method presupposes existence of both of a constellation point with the maximum amplitude and a constellation point with the minimum amplitude, so that it is not applicable to a demodulation circuit according to a PSK modulation method not undergoing amplitude variations.

In contrast, the present embodiment, equipped with the phase error detector 105 executing phase error detection and the amplitude error detector 106 executing amplitude error detection, utilizes all input signals as samples, so that it is applicable to a modulation method with high multi-values. Additionally, the present embodiment does not presuppose existence of a constellation point with the maximum amplitude and a constellation point with the minimum amplitude, so that it is applicable to a demodulation circuit according to a PSK modulation method. In this connection, the demodulation circuit 1 includes the quadrature detector 102, the A/D converter 103, the loop filter 108, and the numerical control oscillator 109, all of which are known constituent elements; hence, detailed descriptions thereof will be omitted here.

Second Embodiment

Figure 13:
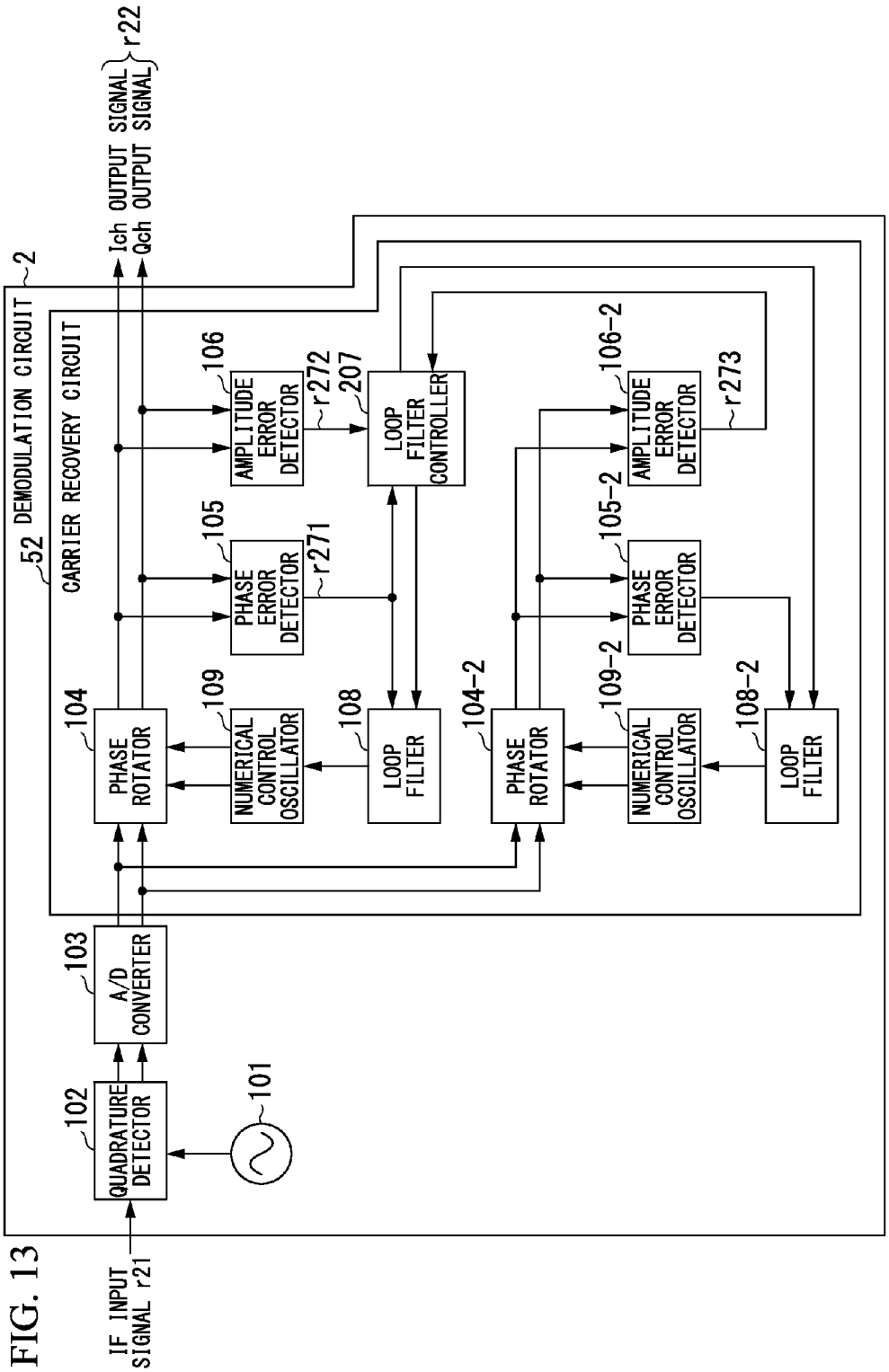
FIG. 13 A block diagram showing the constitution of a demodulation circuit according to a second embodiment of the present invention.

FIG. 13 is a block diagram showing the constitution of a demodulation circuit 2 according to a second embodiment of the present invention. Herein, the constituent elements identical to those of the demodulation circuit 1 shown in FIG. 1 are designated by the same reference numerals. The demodulation circuit 2 is able to handle received signals with varying C/N ratios.

The demodulation circuit 2 includes the reference oscillator 101, the quadrature detector 102, the A/D converter 103, and a carrier recovery circuit 52. The carrier recovery circuit 52 includes the phase rotator 104, the phase error detector 105, the amplitude error detector 106, the loop filter 108, and the numerical control oscillator 109. Additionally, the carrier recovery circuit 52 includes a secondary phase rotator 104-2, a secondary phase error detector 105-2, a secondary amplitude error detector 106-2, a secondary loop filter 108-2, a secondary numerical oscillator 109-2, and a loop filter controller 207.

A first carrier recovery loop includes the phase rotator 104, the phase error detector 105, the amplitude error detector 106, the loop filter 108, the numerical control oscillator 109, and the loop filter controller 207, whilst a second carrier recovery loop includes the phase rotator 104-2, the phase error detector 105-2, the amplitude error detector 106-2, the loop filter 108-2, the numerical control oscillator 109-2, and the loop filter controller 207. The demodulation circuit 2 of the second embodiment differs from the demodulation circuit 1 of the first embodiment in that it includes a plurality of carrier recovery loops, which independently perform carrier recovery processes on the loop filters 108 and 108-2. Since the demodulation circuit 2 includes a plurality of carrier recovery loops both of which operate upon receiving the same baseband signal, these carrier recovery loops undergo the same C/N ratio included in the baseband signal but they use difference loop filter coefficients to cause differences in their characteristics.

Figure 14:
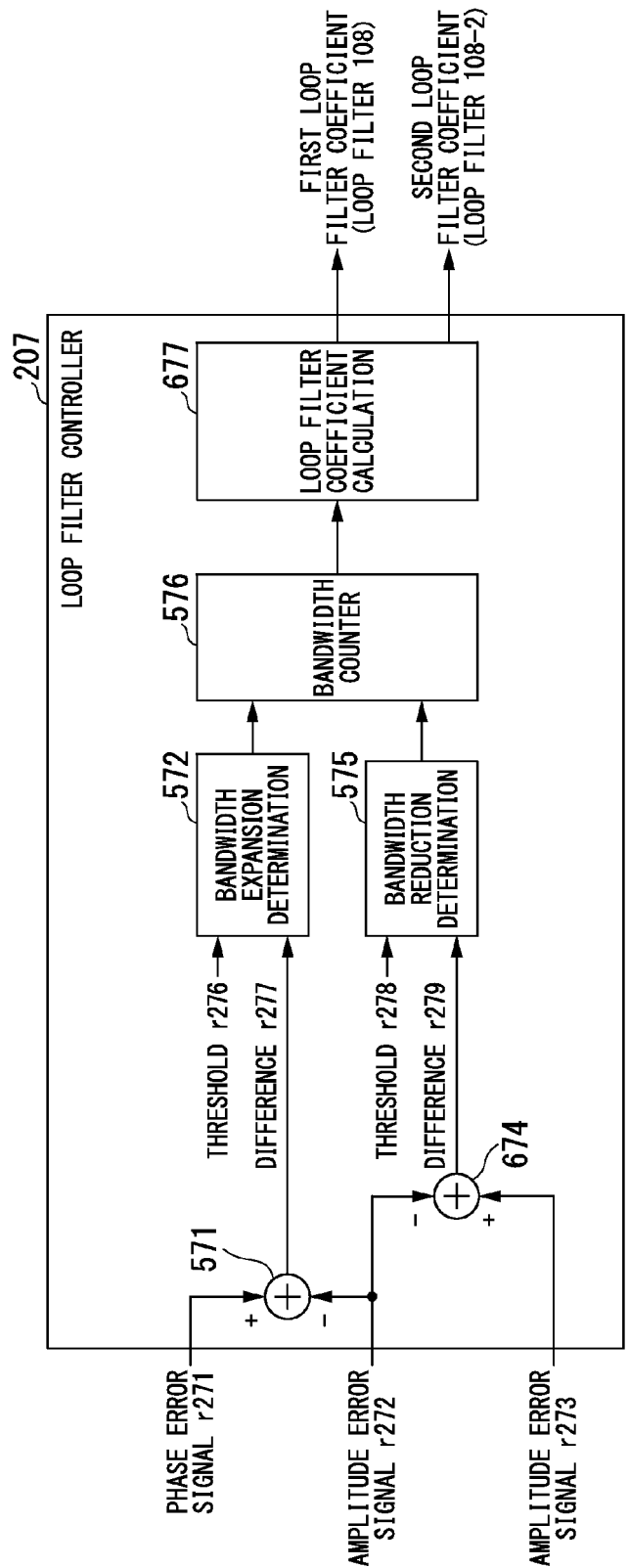
FIG. 14 A block diagram showing the constitution of a loop filter controller which is a constituent element of the demodulation circuit.

FIG. 14 is a block diagram showing the constitution of the loop filter controller 207. Herein, the constituent elements identical to the constituent elements of the loop filter controller 107 shown in FIG. 4 are designated by the same reference numerals. The loop filter controller 207 includes a subtracter 674 and a loop filter coefficient calculation part 677 in addition to the subtracter 571, the bandwidth expansion determination part 572, the bandwidth reduction determination part 575, an the bandwidth counter 576. The subtracter 571 subtracts an amplitude error signal r272 of the amplitude error detector 106 from a phase error signal r271 of the phase error detector 105 so as to send a difference r277 to the bandwidth expansion determination part 572. The subtracter 674 subtracts an amplitude error signal r272 of the amplitude error detector 106 from an amplitude error signal r273 of the amplitude error detector 106-2 so as to send a difference r279 to the bandwidth reduction determination circuit 575. The bandwidth counter 576 increases or decreases its count value based on a bandwidth expansion signal of the bandwidth expansion determination part 572 and a bandwidth reduction signal of the bandwidth reduction determination part 575. The loop filter coefficient calculation part 677 calculates a first loop filter coefficient, representing the bandwidth of the loop filter 108, and a second loop filter coefficient, representing the bandwidth of the loop filter 108-2 based on the count value of the bandwidth counter 576.

Next, the demodulation processing of the demodulation circuit 2 will be described in detail with reference to a flowchart shown in FIG. 15. The demodulation circuit 2 includes the first and second carrier recovery loops which set different bandwidths to the loop filters 108 and 108-2. Additionally, it determines whether or not a BER will be improved by changing the bandwidth of each loop filter.

Figure 11:
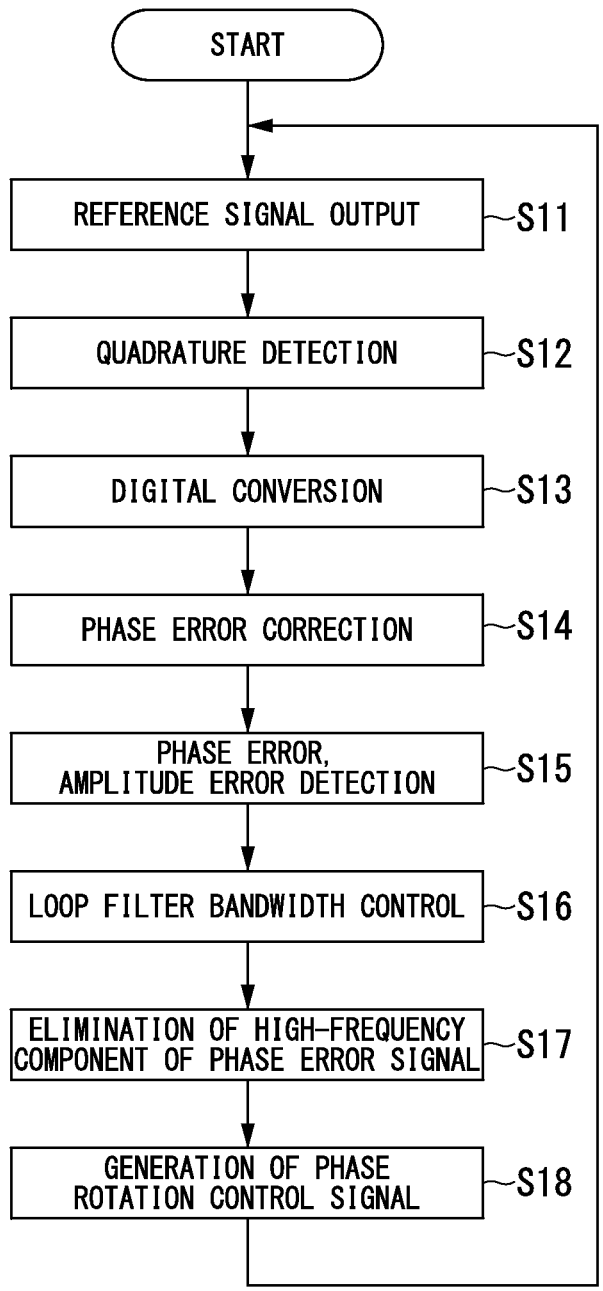
FIG. 11 A flowchart showing a demodulation process of the demodulation circuit.
Figure 15:
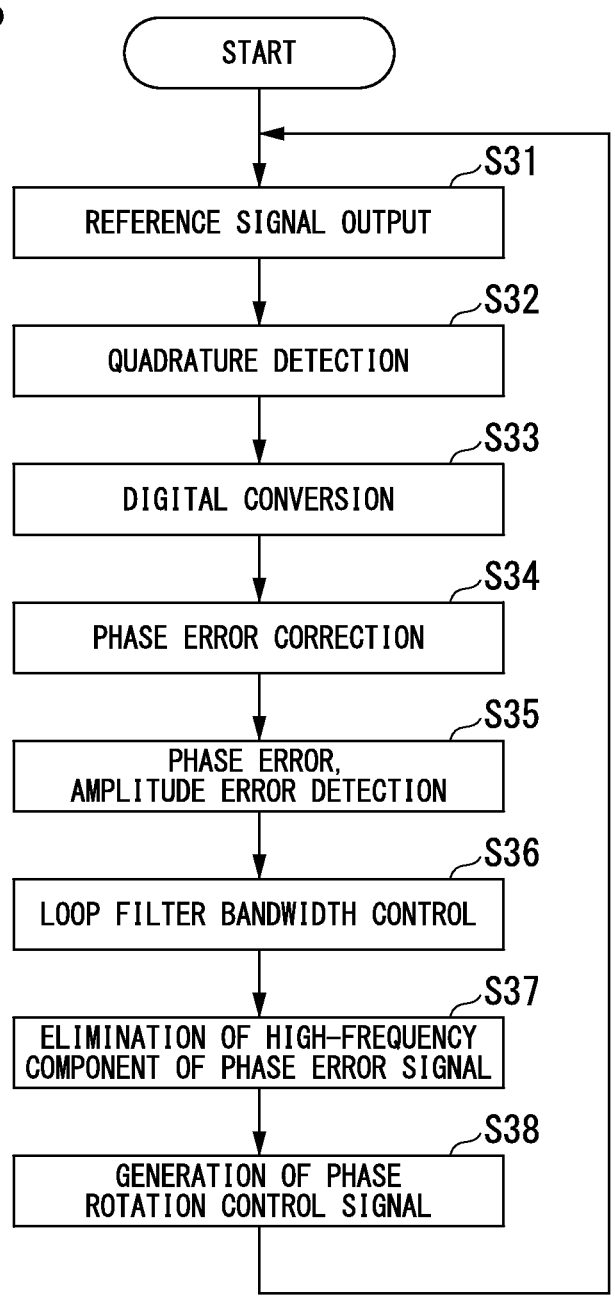
FIG. 15 A flowchart showing a demodulation process of the demodulation circuit.
Figure 16:
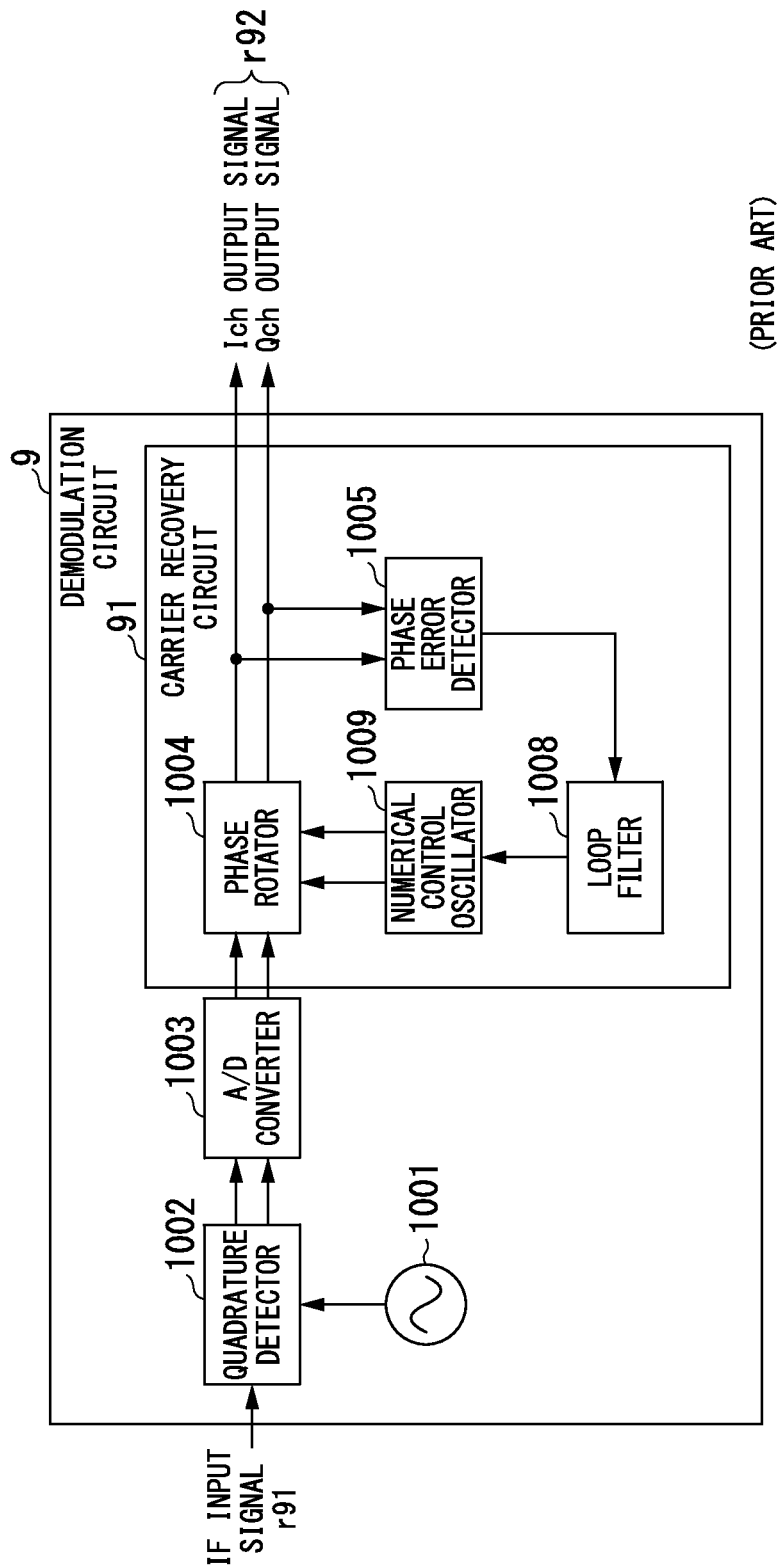
FIG. 16 A block diagram showing the constitution of a conventional demodulation circuit.

Steps S31 and S32 in FIG. 15 are identical to the foregoing steps S11 and S12 in FIG. 11. In step S33, the A/D converter 103 performs A/D conversion on Ich/Qch baseband signals produced by the quadrature detector 102 so as to send digitized Ich/Qch baseband signals to the phase rotators 104 and 104-2.

In step S34, the phase rotator 104 rotates phases of digitized Ich/Qch baseband signals so as to correct phase errors. The phase rotator 104 sends phase error-corrected Ich/Qch baseband signals, as Ich/Qch output signals r22, to an external circuit while delivering them to the phase error detector 105 and the amplitude error detector 106. Additionally, the phase rotator 104-2 rotates phases of digitized Ich/Qch baseband signals so as to correct phase errors. The phase rotator 104-2 sends phase error-corrected Ich/Qch baseband signals to the phase error detector 105-2 and the amplitude error detector 106-2.

In step S35, similar to the foregoing step S15, the phase error detector 105 detects phase errors, which remain in Ich/Qch baseband signals produced by the phase rotator 104, so as to send a phase error signal r271 to the loop filter 108 and the loop filter controller 207. Additionally, the phase error detector 105-2 detects phase errors, which remain in Ich/Qch baseband signals produced by the phase rotator 104-2, so as to send a phase error signal to the loop filter 108-2.

Additionally, the amplitude error detector 106 detects amplitude errors, which remain in Ich/Qch baseband signals produced by the phase rotator 104, so as to send an amplitude error signal r272 to the loop filter controller 207. Additionally, the amplitude error detector 106-2 detects amplitude errors, which remain in Ich/Qch baseband signals produced by the phase rotator 104-2, so as to send an amplitude error signal r273 to the loop filter controller 207.

In step S36, the loop filter controller 207 controls the bandwidths of the loop filters 108 and 108-2 based on a phase error signal r271 of the phase error detector 105, an amplitude error signal r272 of the amplitude error detector 106, and an amplitude error signal r273 of the amplitude error detector 106-2.

In the loop filter controller 207, the subtracter 571 subtracts an amplitude error signal r272 from a phase error signal r271 so as to send a difference r277 to the bandwidth expansion determination part 572. The bandwidth expansion determination part 572 sends a bandwidth expansion signal to the bandwidth counter 576 when the difference r277 is greater than a predetermined threshold r276. On the other hand, the subtracter 674 subtracts an amplitude error signal r272 from an amplitude error signal r273 so as to send a difference r279 to the bandwidth reduction determination part 575. The bandwidth reduction determination part 575 sends a bandwidth reduction signal to the bandwidth counter 576 when the difference r279 is greater than a predetermined threshold r278.

The bandwidth counter 576 increases or decreases its count value in response to a bandwidth expansion signal or a bandwidth reduction signal, thus sending it to the loop filter coefficient calculation part 677.

The loop filter coefficient calculation part 677 calculates a first loop filter coefficient, applied to the loop filter 108, based on the count value of the bandwidth counter 576. Additionally, the loop filter coefficient calculation part 677 calculates a second loop filter coefficient, applied to the loop filter 108-2, based on the count value of the bandwidth counter 576. The bandwidth of the loop filter 108-2 specified by the second loop filter coefficient is expanded to be greater than the bandwidth of the loop filter 108 specified by the first loop filter coefficient by a predetermined value. The loop filter coefficient calculation part 677 sends first and second loop filter coefficients to the loop filters 108 and 108-2.

In step S37, the loop filter 108 whose bandwidth is specified by the first loop filter coefficient eliminates unnecessary high-frequency components from a phase error signal r271 produced by the phase error detector 105, thus sending it to the numerical control oscillator 109. Additionally, the loop filter 108-2 whose bandwidth is specified by the second loop filter coefficient eliminates unnecessary high-frequency components from a phase error signal produced by the phase error detector 105-2, thus sending it to the numerical control oscillator 109-2.

In step S38, the numerical control oscillator 109 generates a sine-wave signal and a cosine-wave signal with an inverse phase based on the phase error signal from the loop filter 108, thus sending them to the phase rotator 104. The phase rotator 104 rotates phases of Ich/Qch baseband signals based on a sine-wave signal and a cosine-wave signal with an inverse phase, which are produced by the numerical control oscillator 109. Additionally, the numerical control oscillator 109-2 produces a sine-wave signal and a cosine-wave signal with an inverse phase based on a phase error signal produced by the loop filter 108-2, thus sending them to the phase rotator 109-2. The phase rotator 109-2 rotates phases of Ich/Qch baseband signals based on a sine-wave signal and a cosine-wave signal with an inverse phase, which are produced by the numerical control oscillator 109-2. The demodulation circuit 2 continuously executes the foregoing demodulation processing on IF input signals r21.

Thus, the loop filter coefficient calculation part 677 controls the bandwidth of the loop filter 108-2 to be broader than the bandwidth of the loop filter 108. It is estimated that expanding the bandwidth of the loop filter 108 may increase amplitude errors when the subtracter 674 produces a positive difference r279 (i.e. a difference produced by subtracting an amplitude error signal r272 of the first carrier recovery loop from an amplitude error signal r273 of the second carrier recovery loop). For this reason, when a difference r279 is greater than a threshold r278, the bandwidth reduction determination part 575 produces a bandwidth reduction signal so as to reduce the bandwidth of the loop filter 108, thus reducing amplitude errors.

In this connection, the loop filter coefficient calculation part 677 may control the bandwidth of the loop filter 108-2 to be narrower than the bandwidth of the loop filter 108, so that the subtracter 674 may subtract an amplitude error signal r273 from an amplitude error signal r272. Thus, it is possible to determine whether or not amplitude errors decrease due to a reduction of the bandwidth of the loop filter 108.

In the second embodiment, when both the bandwidth expansion signal and the bandwidth reduction signal are concurrently supplied to the bandwidth counter 576, a bandwidth expansion process or a bandwidth reduction process is carried out based on a predetermined priority order, thus preventing the occurrence of a deadlock state due to collision of processes. In this case, it is possible to execute either the bandwidth expansion process or the bandwidth reduction process at first.

In the carrier recovery circuit 52 of the second embodiment, the loop filter controller 207 controls the bandwidths of the loop filters 108 and 108-2 based on phase errors and amplitude errors, so that it is possible to improve bit error rate (BER) characteristics by optimizing bandwidths. Additionally, the carrier recovery circuit 52 includes a plurality of carrier recovery loops with different loop filter bandwidths so as to control loop filer bandwidths through determination as to whether or not amplitude errors increase due to a reduction of a loop filter bandwidth based on phase errors and amplitude errors in each carrier recovery loop. This makes it possible to set appropriate loop filter coefficients irrespective of the situation undergoing varying C/N ratios of received signals, thus improving bit error rate (BER) characteristics.

Lastly, the present invention is not necessarily limited to the foregoing embodiments and therefore embraces various modifications within the scope of the invention as defined by the appended claims.

INDUSTRIAL APPLICABILITY

The present invention is preferable for use in power supply control processing in portable terminal devices and mobile terminal devices adapted to digital radio communication systems.

REFERENCE SIGNS LIST 1 demodulation circuit
51 carrier recovery circuit
101 reference oscillator
102 quadrature detector
103 A/D converter
104 phase rotator
105 phase error detector
106 amplitude error detector
107 loop filter controller
108 loop filter
109 numerical control oscillator
571 subtracter
572 bandwidth expansion determination part
573 minimum value retention part
574 subtracter
575 bandwidth reduction determination part
576 bandwidth counter
577 loop filter coefficient calculation part
2 demodulation circuit
52 carrier recovery circuit
104-2 phase rotator
105-2 phase error detector
106-2 amplitude error detector
108-2 loop filter
109-2 numerical control oscillator
207 loop filter controller
674 subtracter
677 loop filter coefficient calculation part

The invention claimed is:

1. A carrier recovery circuit adapted to a demodulation circuit according to a quasi-coherent detection method, said carrier recovery circuit comprising:

a phase rotator that rotates a phase of a baseband signal detected from a received signal;
a phase error detector that detects a phase error included in the baseband signal with the rotated phase;
an amplitude error detector that detects an amplitude error included in the baseband signal with the rotated phase;
a loop filter that eliminates a high-frequency component from the phase error;
a loop filter controller that controls a bandwidth of the loop filter based on the phase error and the amplitude error; and
a phase rotation controller that controls the phase rotator based on the phase error eliminating its high-frequency component,
wherein the loop filter controller expands the bandwidth of the loop filter when a difference between the phase error and the amplitude error is greater than a predetermined threshold, whilst the loop filter controller reduces the bandwidth of the loop filter upon determining that the amplitude error decreases due to a reduction of the bandwidth of the loop filter,
wherein the loop filter controller determines that the amplitude error decreases due to a reduction of the bandwidth of the loop filter when a difference between the amplitude error and a minimum value among previous amplitude errors is greater than the predetermined threshold.

2. The carrier recovery circuit according to claim 1, wherein the phase rotation controller is a numerical control oscillator that produces a sine-wave signal and a cosine-wave signal with an inverse phase based on the phase error eliminating its high-frequency component so as to send them to the phase rotator, thus controlling phase rotation applied to the baseband signal.

3. A carrier recovery circuit adapted to a demodulation circuit according to a quasi-coherent detection method, said carrier recovery circuit comprising:

a phase rotator that rotates a phase of a baseband signal detected from a received signal;
a phase error detector that detects a phase error included in the baseband signal with the rotated phase;
an amplitude error detector that detects an amplitude error included in the baseband signal with the rotated phase;
a loop filter that eliminates a high-frequency component from the phase error;
a loop filter controller that controls a bandwidth of the loop filter based on the phase error and the amplitude error;
a phase rotation controller that controls the phase rotator based on the phase error eliminating its high-frequency component,
wherein the loop filter controller expands the bandwidth of the loop filter when a difference between the phase error and the amplitude error is greater than a predetermined threshold, whilst the loop filter controller reduces the bandwidth of the loop filter upon determining that the amplitude error decreases due to a reduction of the bandwidth of the loop filter;
a secondary phase rotator that rotates a phase of the baseband signal detected from the received signal;
a secondary phase error detector that detects a phase error included in the baseband signal whose phase is rotated by the secondary phase rotator;
a secondary amplitude error detector that detects an amplitude error included in the baseband signal whose phase is rotated by the secondary phase rotator;
a secondary loop filter that eliminates a high-frequency component from the phase error detected by the secondary phase error detector; and a secondary phase rotation controller that controls the secondary phase rotator based on the phase error whose high-frequency component is eliminated by the secondary loop filter, wherein the loop filter controller sets different bandwidths to the loop filter and the secondary loop filters, wherein the loop filter controller expands both the bandwidths of the loop filter and the secondary loop filter when a difference between the phase error of the phase error detector and the amplitude error of the amplitude error detector is greater than a predetermined threshold, and wherein the loop filter controller determines that the amplitude error decreases due to a reduction of the bandwidth of the loop filter when a difference between the amplitude error of the amplitude error detector and the amplitude error of the secondary amplitude error detector is greater than a predetermined threshold, thus reducing both the bandwidths of the loop filter and the secondary loop filter.

4. The carrier recovery circuit according to claim 3, wherein the secondary phase rotation controller is a numerical control oscillator that generates a sine-wave signal and a cosine-wave signal with an inverse phase based on the phase difference whose high-frequency component is eliminated by the secondary loop filter, thus controlling phase rotation applied to the baseband signal.

5. A demodulation circuit comprising:
a reference oscillator that carries out free-running oscillation on a reference signal with a reference frequency;
a quadrature detector that demodulates a received signal having an intermediate frequency with the reference signal so as to generate baseband signals whose phases are orthogonal to each other;
an A/D converter that performs A/D conversion on the baseband signals;
a phase rotator that rotates the phases of the digitized baseband signals;
a phase error detector that detects a phase error included in the baseband signals with the rotated phases;
an amplitude error detector that detects an amplitude error included in the baseband signals with the rotated phases;
a loop filter that eliminates a high-frequency component from the phase error;
a loop filter controller that controls a bandwidth of the loop filter based on the phase error and the amplitude error;
a phase rotation controller that controls the phase rotator based on the phase error eliminating its high-frequency component;
a secondary phase rotator that rotates the phases of the baseband signals detected from the received signal;
a secondary phase error detector that detects a phase error included in the baseband signals whose phases are rotated by the secondary phase rotator;
a secondary amplitude error detector that detects an amplitude error included in the baseband signals whose phases are rotated by the secondary phase rotator;
a secondary loop filter that eliminates a high-frequency component from the phase error detected by the secondary phase error detector; and
a secondary phase rotation controller that controls the secondary phase rotator based on the phase error whose high-frequency component is eliminated by the secondary loop filter,
wherein the loop filter controller sets different bandwidths to the loop filter and the secondary loop filters, wherein the loop filter controller expands both the bandwidths of the loop filter and the secondary loop filter when a difference between the phase error of the phase error detector and the amplitude error of the amplitude error detector is greater than a predetermined threshold, and wherein the loop filter controller reduces both the bandwidths of the loop filter and the secondary loop filter when a difference between the amplitude error of the amplitude error detector and the amplitude error of the secondary amplitude error detector is greater than a predetermined threshold.

6. A carrier recovery method adapted to a demodulation circuit according to a quasi-coherent detection method, said carrier recovery method comprising:
rotating a phase of a baseband signal detected from a received signal;
detecting a phase error included in the baseband signal with the rotated phase;
detecting an amplitude error included in the baseband signal with the rotated phase;
controlling a bandwidth of a loop filter based on the phase error and the amplitude error, thus eliminating a high-frequency component from the phase error; and
controlling phase rotation based on the phase error eliminating its high-frequency component,
wherein the bandwidth of the loop filter is expanded when a difference between the phase error and the amplitude error is greater than a predetermined threshold, and the bandwidth of the loop filter is reduced upon determining that the amplitude error decreases due to a reduction of the bandwidth of the loop filter, and
wherein the amplitude error is decreased due to a reduction of the bandwidth of the loop filter when a difference between the amplitude error and a minimum value among previous amplitude errors is greater than the predetermined threshold.

7. A demodulation method according to a quasi-coherent detection method using a loop filter, said demodulation method comprising:
demodulating a received signal having an intermediate frequency with a reference signal having a reference frequency, thus generating baseband signals whose phases are orthogonal to each other;
performing A/D conversion on the baseband signals;
rotating phases of the digitized baseband signals;
detecting a phase error included in the baseband signals with rotated phases;
detecting an amplitude error included in the baseband signals with rotated phases;
controlling a bandwidth of the loop filter based on the phase error and the amplitude error; and
controlling phase rotation based on the phase error whose high-frequency component is eliminated by the loop filter,
wherein the bandwidth of the loop filter is expanded when a difference between the phase error and the amplitude error is greater than a predetermined threshold, and the bandwidth of the loop filter is reduced upon determining that the amplitude error decreases due to a reduction of the bandwidth of the loop filter, and
wherein the amplitude error is decreased due to a reduction of the bandwidth of the loop filter when a difference between the amplitude error and a minimum value among previous amplitude errors is greater than the predetermined threshold.

* * * * *